US012586945B2

(12) United States Patent
Kim et al.

(10) Patent No.: US 12,586,945 B2
(45) Date of Patent: Mar. 24, 2026

(54) ELASTIC ELECTRIC CONTACT TERMINAL

(71) Applicant: JOINSET CO., LTD., Ansan-si (KR)

(72) Inventors: Sun-Ki Kim, Gunpo-si (KR); Byung-Joo Park, Ansan-si (KR); Jin-San Kim, Ansan-si (KR); Hyoung-Kyu Kim, Ansan-si (KR)

(73) Assignee: JOINSET CO., LTD. (KR)

( * ) Notice: Subject to any disclaimer, the term of this patent is extended or adjusted under 35 U.S.C. 154(b) by 302 days.

(21) Appl. No.: 18/220,341

(22) Filed: Jul. 11, 2023

(65) Prior Publication Data

US 2024/0014589 A1 Jan. 11, 2024

(30) Foreign Application Priority Data

Jul. 11, 2022 (KR) ........................ 10-2022-0085329
Jul. 25, 2022 (KR) ........................ 10-2022-0092092

(51) Int. Cl.
*H01R 4/58* (2006.01)
*H01R 13/24* (2006.01)

(52) U.S. Cl.
CPC ........... *H01R 13/2407* (2013.01); *H01R 4/58* (2013.01)

(58) Field of Classification Search
CPC ....... H01R 13/2407; H01R 4/58; H01R 13/24
USPC .......................................................... 439/66
See application file for complete search history.

(56) References Cited

U.S. PATENT DOCUMENTS 7,771,213 B2 * 8/2010 Kim .................. H01R 13/2414 439/83
2009/0209121 A1 * 8/2009 Kim ..................... H05K 3/4015 439/83
2017/0077891 A1 * 3/2017 Kim ..................... H05K 1/0296
2020/0396872 A1 * 12/2020 Kim ..................... H05K 9/0084

FOREIGN PATENT DOCUMENTS

KR 100993253 B1 11/2010
KR 101001354 B1 12/2010
KR 102212351 B1 1/2021
KR 102324261 B1 11/2021
KR 102340421 B1 12/2021

* cited by examiner

*Primary Examiner* — Tulsidas C Patel
*Assistant Examiner* — Thaslimur Rahman
(74) *Attorney, Agent, or Firm* — Park & Associates IP Law Office

(57) ABSTRACT

Disclosed is an elastic electric contact terminal that does not give an effect on a metal layer even when a core is pressed by external force. The elastic electric contact terminal includes an elastic core, a heat-resistant polymer film that surrounds the core and is attached to top and bottom surfaces of the core with an adhesive layer therebetween, and a metal layer disposed on an outer surface of the polymer film. At least one sidewall of the core is pressed inward to form a folded portion, and a space is defined between an inner surface of the polymer film and the sidewall of the core by the folded portion.

13 Claims, 5 Drawing Sheets

ELASTIC ELECTRIC CONTACT TERMINAL

REFERENCE TO RELATED APPLICATIONS

This application claims the priority benefit of Korean Patent Application No. 10-2022-0085329 filed on Jul. 11, 2022 and Korean Patent Application No. 10-2022-0092092 filed on Jul. 25, 2022, the entire contents of which are incorporated herein by reference.

FIELD OF THE INVENTION

The present disclosure relates to an elastic electric contact terminal, and more particularly, to an elastic electric contact terminal capable of minimizing generation of a crack of a metal layer even when the elastic electric contact terminal is pressed in a vertical direction by external force.

BACKGROUND OF THE INVENTION

In general, a solderable elastic electric contact terminal may be vacuum-picked up for surface mounting, have low electrical resistance and excellent resilience by elasticity, withstand a soldering temperature, and have high soldering strength after soldered.

Also, the elastic electric contact terminal may be pressed in a wide range with less pressing force and have excellent resilience after pressed.

Particularly, the elastic electric contact terminal may be disposed between objects having electrical conductivity and disposed opposite to each other in a vertical direction, and electrically connect the upper and lower objects with low electrical resistance when the objects press the electric contact terminal in the vertical direction.

The above-described electric contact terminal is disclosed in Korean Patent Registration No. 10-1001354 of the present applicant.

When the electric contact terminal is pressed by receiving force from the upper object caused by vertical pressure, a core is folded or stress is concentrated in a portion that is easily spread laterally by applied force or a portion in which stress is concentrated.

When stress is concentrated by repeated folding caused by pressing, damage such as a crack may occur in a metal layer of the portion.

For example, stress is easily concentrated at a solder or soldered portion, and the metal layer disposed at the core receiving a lot of stress or force is severely deformed when the film and the core are entirely attached to each other.

In order to solve the above-described limitation, a space is defined between an insulating non-foaming rubber coating layer and an insulating elastic core by attaching only a heat-resistant polymer film to the insulating non-foaming rubber coating layer in a portion in which side surfaces of the heat-resistant polymer film is surrounded and bent in an arc shape as disclosed in Korean Patent Registration No. 10-0993253, filed by the present applicant, or a space is defined so that a polymer film or a metal layer is not attached to both side surfaces of the core in a portion in which both side surfaces of the core are surrounded and bent in an arc shape as disclosed in Korea Patent Registration No. 10-2212351, filed by the present applicant.

Also, as disclosed in Korean Patent Registration No. 10-2324261, a space is defined between an elastic core and a non-conductive coating layer at both side surfaces of the elastic core while the non-conductive coating layer surrounds top and bottom surfaces and both side surfaces of the elastic core. Particularly, referring to FIG. 2 of the corresponding patent, a space is defined in a portion such that a non-conductive coating layer, i.e., an adhesive layer, protrudes convexly without being attached to the core in the corresponding portion.

However, an operation of allowing the non-conductive coating layer to protrude convexly without being attached to the core is difficult to be performed in a manufacturing process.

For example, since a liquid non-conductive coating layer is cast with a uniform thickness on a polymer film and then continuously passes through a mold to surround a sidewall of the core, an operation of allowing a portion of the sidewall of the core to protrude convexly without being attached to the core is difficult to be performed, and a size and a position of the space is difficult to be adjusted.

Also, referring to FIG. 3 of the corresponding patent, it is described that the core corresponding to the space expands laterally and fills the space when the electric contact terminal is pressed downward from above. However, when the core is pressed, substantially, entire both sides of the core are spread laterally instead of only a specific portion being expanded. Thus, since the expanded core does not fill only the space, the metal layer is easily damaged.

Also, when the electric contact terminal is excessively pressed, the space that is defined in a limited portion as the non-conductive coating layer protrudes convexly may not accommodate the entire core spreading in various directions, and thus the metal layer is easily damaged.

Also, only a core having a through-hole is applied.

Also, since adhesion strength between the polymer film and the metal layer is not sufficient, when the metal layer of the electric contact terminal having a short length is soldered on a circuit board by solder cream, the electric contact terminal is easily separated from the metal layer by external force.

SUMMARY OF THE INVENTION

The present disclosure provides an elastic electric contact terminal capable of minimizing an effect on a metal layer and minimizing a generation of a crack in the metal layer even when a core is pressed in a vertical direction after the electric contact terminal is soldered to a circuit board by external force.

The present disclosure also provides an elastic electric contact terminal capable of maximally providing a space in which a polymer film and a sidewall of the core are not attached to each other in a reliable and economical manner.

The present disclosure also provides an elastic electric contact terminal capable of minimizing a generation of a crack or deformation of a metal layer when a core is pressed from the outside by reinforcing elasticity and mechanical strength in a polymer film.

The present disclosure also provides an elastic electric contact terminal capable of allowing a polymer film disposed in correspondence to a space to be spread outward from a sidewall when the core is pressed from the outside.

The present disclosure also provides an elastic electric contact terminal having excellent resilience and having the center of gravity positioned below a portion at which the electric contact terminal is soldered.

The present disclosure also provides an elastic electric contact terminal in which an edge of a core is hardly spread upward by external force.

The present disclosure also provides an elastic electric contact terminal capable of improving soldering strength even when the elastic contact terminal has a short length.

An embodiment of the present disclosure provides an elastic electric contact terminal including: an elastic core; a heat-resistant polymer film that continuously surrounds the core in a longitudinal direction and is attached to top and bottom surfaces of the core with an adhesive layer having elasticity therebetween; and a metal layer disposed on an outer surface of the polymer film. Here, a through-hole that passes in the longitudinal direction is defined in the core, a surface for vacuum-pick up is provided on the top surface of the electric contact terminal, a sidewall of the core between the top and bottom surfaces of the core is bent toward a central axis in a width direction of the core to form a folded portion, and a space is defined between an inner surface of the polymer film and the sidewall of the core by the folded portion.

In an embodiment, the folded portions may be symmetrically disposed on both sidewalls and disposed at an intermediate portion of a height direction of the core.

In an embodiment, a stopper integrated with the core and disposed at the folded portion may protrude in a horizontal direction.

In an embodiment, the folded portion may have an hourglass shape or an X-shape in a vertical cross-section.

In an embodiment, the adhesive layer may be disposed on the entire inner surface of the polymer film, and the inner surface of the polymer film may not be attached to the sidewall of the core by the folded portion.

In an embodiment, a width of the bottom surface of the core may be greater than that of the top surface of the core, a thickness of a lower wall of the core may be greater than that of an upper wall of the core, or a volume of the lower wall of the core may be greater than that of the upper wall of the core.

In an embodiment, an elastic reinforcing layer made of a polymer material and integrated with the polymer film between the polymer film and the adhesive layer may have a uniform thickness.

In an embodiment, the polymer film may be bent in a direction opposite to a direction in which the folded portion is folded when the electric contact terminal is soldered and then pressed downward from above.

In an embodiment, the polymer film configured to cover the space may be maintained to be flat so that the space has a constant size and have tension enough to prevent the core from being deformed.

In an embodiment of the present disclosure, an elastic electric contact terminal includes: an elastic core; a heat-resistant polymer film that continuously surrounds the core in a longitudinal direction and is attached to top and bottom surfaces of the core with an adhesive layer having elasticity therebetween; and a metal layer disposed on an outer surface of the polymer film. Here, the core has a sigma (Σ) shape in a vertical cross-section, a surface for vacuum-pick up is provided on the top surface of the electric contact terminal, a folded portion is disposed on a sidewall of the core between the top and bottom surfaces of the core by the shape of the vertical cross-section, and a space is defined between an inner surface of the polymer film and the sidewall of the core by the folded portion, and reflow soldering caused is performed by surface mounting.

In an embodiment of the present disclosure, an elastic electric contact terminal includes: an elastic core; a heat-resistant polymer film that continuously surrounds the core in a longitudinal direction and is attached to top and bottom surfaces of the core with an adhesive layer having elasticity therebetween; and a metal layer disposed on an outer surface of the polymer film. Here, the core has a Z-shape in a vertical cross-section, a surface for vacuum-pick up is provided on the top surface of the electric contact terminal, a folded portion is disposed on each of upper and lower ends of a sidewall of the core between upper and lower walls of the core by the shape of the vertical cross-section, and a space is defined between an inner surface of the polymer film and the sidewall of the core by the folded portion, and reflow soldering is performed by surface mounting.

In an embodiment, the elastic electric contact terminal may further include a metal clip that is inserted to a lower portion of the core so as to be in contact with the bottom surface of the core and reflow-soldered. Here, the metal clip may include: a base that extends in the longitudinal direction and is in contact with the bottom surface of the core; and bridges bent at both ends of the base to grip a lower wall of the core at both ends in the longitudinal direction, respectively.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF THE INVENTION

In the following description, the technical terms are used only for explain a specific exemplary embodiment while not limiting the present invention. Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

Hereinafter, specific embodiments of the present disclosure will be described in detail with reference to the accompanying drawings.

Figure 1:
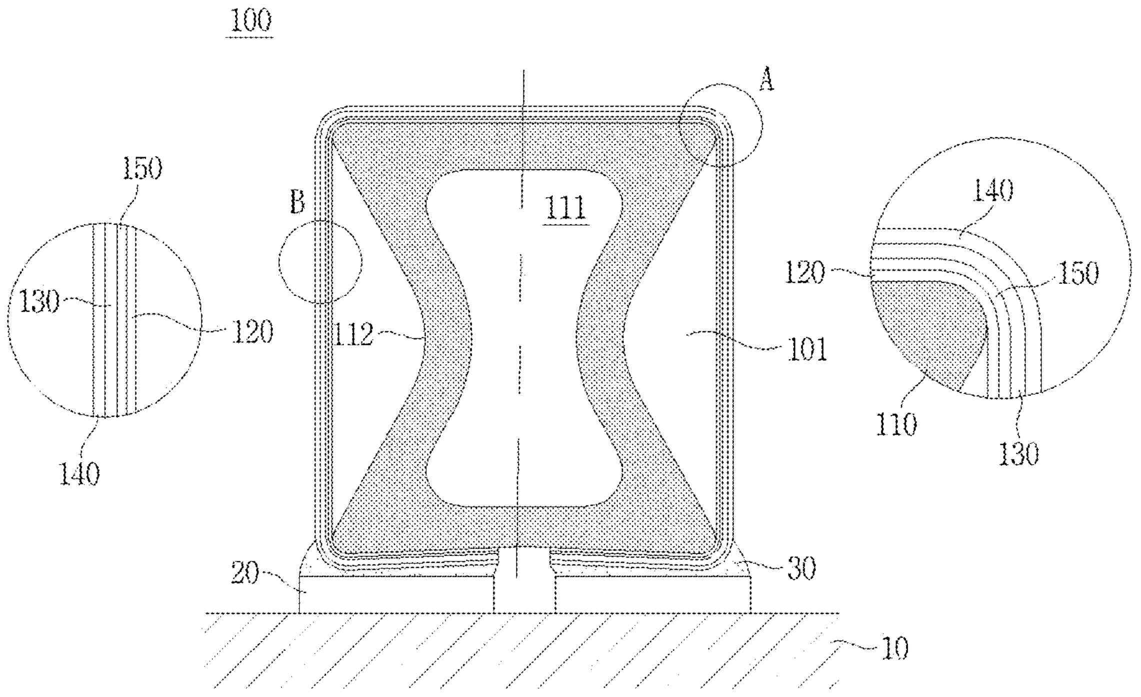
FIG. 1 is a view illustrating an elastic electric contact terminal according to an embodiment of the present disclosure.
Figure 2:
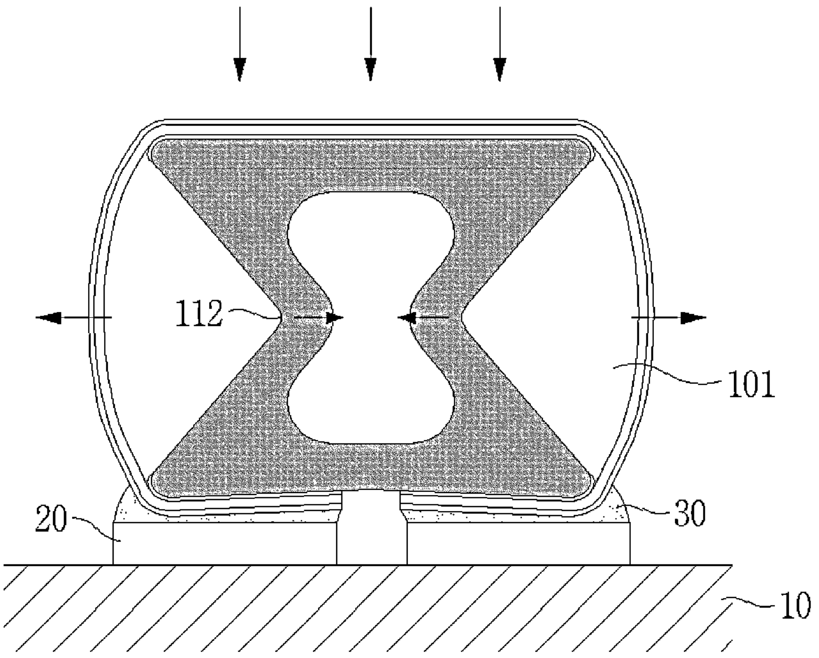
FIG. 2 is a view illustrating a state in which the electric contact terminal is mounted and pressed.

FIG. 1 is a view illustrating an elastic electric contact terminal according to an embodiment of the present disclosure, and FIG. 2 is a view illustrating a state in which the elastic electric contact terminal is mounted and pressed.

An electric contact terminal 100 includes an elastic core 110 which has a tube shape and in which a through-hole 111 is defined in a longitudinal direction thereof, a heat-resistant polymer film 130 attached to top and bottom surfaces of the core 110 with an adhesive layer 120 therebetween and surrounding the core 110 in a width direction of the core 110 and extending in the longitudinal direction, and a metal layer 140 disposed on an outer surface of the polymer film 130. The polymer film 130 covering a sidewall of the core 110 forms a space 101 instead of being attached to the sidewall of the core 110.

The core 110 according to this embodiment has an approximately hourglass shape in a vertical cross-section, and a folded portion 112 that forms a recessed shape toward a virtual central axis (dash-double-dot line) in a width direction of the core 110 is disposed on each of both sidewalls corresponding to an approximately intermediate portion of a height direction of the core 110.

Here, the folded portion 112 represents a portion folded while both the sidewalls of the core 110 move inward when the core 110 pressed downward from above.

The folded portion 112 may be symmetrical at both the sidewalls to uniformly receive force applied downward from above.

Here, the term 'intermediate portion' may represent a position corresponding to an approximately intermediate portion instead of representing a dimensionally exact intermediate portion. The folded portion 112 may be disposed at a position slightly higher than a half of a height of the core 110 for mechanical stability.

As described above, the through-hole 111 is defined in in the core 110 in the longitudinal direction. In this embodiment, the through-hole 111 has an hourglass shape in cross-section similarly to that of the core 110.

Although a distance by which the folded portion 112 moves inward by the force pressing downward from above in a vertical direction is not specified, the distance may be within a range in which the folded portions 112 are not in contact with each other in the through-hole 111 when the core 110 is pressed by the force applied from above. Alternatively, the folded portions 112 may be partially in contact with each other.

The adhesive layer 120 disposed on an inner surface of the polymer film 130 corresponding to both the sidewalls of the core 110 is not adhered to both the sidewalls of the core 110 to form the space 101.

Referring to FIG. 1, since the polymer film 130 is attached to the top and bottom surfaces of the core 110 with the adhesive layer 120 therebetween and surrounds the top and bottom surfaces of the core 110, the space 101 is structurally naturally defined by the folded portion 112 of the core 110.

As the adhesive layer 120 is disposed on an entire surface of the polymer film 130, the adhesive layer 120 is also disposed on the polymer film 130 disposed in correspondence to the space 101.

Since the adhesive layer 120 having elasticity, which is adhered to the polymer film 130 disposed in correspondence to the space 101, improves elasticity and mechanical strength of the polymer film 130 disposed in the space 101, damages and deformations of the metal layer 140 and the polymer film 130 caused by external force are reduced.

In the present disclosure, when the polymer film 130 surrounds and is attached to the top and bottom surfaces of the core 110 with the adhesive layer 120 therebetween, the polymer film 130 is naturally attached to and surrounds both edges of the top and bottom surfaces of the core 110. Here, both the edges include side surfaces each having a short distance.

As described above, the side surfaces included in both the edge of the top and bottom surfaces of the core 110 is not included in the sidewalls of the core 110 because the side surfaces correspond to a thickness portion of the upper and lower walls of the core 110.

The space 101 may have a size proportional to a distance by which the folded portion 112 of the core 110 is pushed inward.

The space 101 may be defined as large as possible to sufficiently accommodate the deformation of the core 110 when the core 110 is pressed downward from above.

Although the through-hole 111 has the hourglass shape so that the core 110 is easily or largely pressed even by small force in this embodiment, the embodiment is not limited thereto.

Each of the folded portion 112 and the through-hole 111 may have various shapes and sizes depending on a pressed range of the core 110 and the pressing force according to a purpose of the present disclosure.

For example, as a width of the bottom surface of the core 110 is greater than that of the top surface of the core 110, a thickness of the lower wall of the core 110 is greater than that of the upper wall of the core 110, or a volume of the lower wall of the core 110 is greater than that of the upper wall of the core 110, the electric contact terminal 100 may have excellent resilience and be reliably mounted on a surface.

Also, the through-hole 111 may have a shape and a size that allow the core 110 to be easily and greatly pressed.

The width of the top surface of the core 110 may be less than that of the bottom surface of the core 110 so that the electric contact terminal moves less when the electric contact terminal 100 is mounted on the surface and has excellent soldering strength after soldering, and the polymer film 110 is spaced apart from a central portion of the bottom surface of the core 110 for easily performing reflow soldering.

Also, when the width of the top surface of the core 110 is less than that of the bottom surface of the core 110, a contact of the electric contact terminal 100 from the outside after soldering may be reduced.

Also, since both the edges of the top and bottom surfaces of the core 110 are curved, a damage to the electric contact terminal 100 caused by external force after soldering is reduced.

As the electric contact terminal 100 is vacuum-picked up from the metal layer 140 disposed on the top surface of the core 110, the metal layer 140 disposed on the bottom surface is reflow-soldered by solder cream.

As is well known, the core 110 and the adhesive layer 120 are made of silicone rubber having excellent elasticity, and the polymer film 130 is made of a material having heat resistance and flexibility such as polyimide. Both the materials withstand a soldering temperature.

The core 110 in which the through-hole 111 is defined is extruded into various shapes, and the adhesive layer 120 is provided by curing a liquid silicone adhesive.

Also, the metal layer 140 disposed on the outer surface of the polymer film 130 is provided by sputtering metal on the polymer film 130 and plating copper, by casting a liquid polymer resin on a copper foil and then curing the same, or by attaching a copper foil to the polymer film 130 using another adhesive. The metal layer 140 may be provided by sequentially plating tin, nickel, and gold on the copper foil.

Although not particularly limited, the polymer film 130 may have a thickness of about 5 μm to about 25 μm, the adhesive layer 120 may have a thickness of about 10 μm to about 50 μm, and the metal layer 140 may have a thickness of about 2 μm to about 20 μm. Theses dimensions are variously designed appropriately to characteristics of the electric contact terminal 100.

Selectively, as enlarged and illustrated in a circle B of FIG. 1, an elastic reinforcing layer 150 made of a flexible polymer material may be attached to an inner surface of the polymer film 130.

The elastic reinforcing layer 150 is a silicone rubber layer having elasticity and excellent adhesion like as the adhesive layer 120.

The elastic reinforcing layer 150 is attached to the core 110 with the adhesive layer 120 disposed at the top and bottom surfaces of the core 110 and covered by the adhesive layer 120 the space 101 of both the sidewalls of the core 110.

Since a portion of the elastic reinforcing layer 150 corresponding to the space 101 of both the sidewalls of the core 110 provides elasticity and mechanical strength to the polymer film 130, the polymer film 130 and the metal layer 140 disposed at the portion may be protected, and the polymer film 130 is easily spread in outer directions of both the sidewalls by the force applied downward from above the core 110.

For example, the elastic reinforcing layer 150 may have a thickness, e.g., about 10 μm to about 50 μm and has a uniform thickness on the polymer film 130 by a casting process.

Referring to FIG. 2, when force is applied from the top surface to the bottom surface of the electric contact terminal 100 to press the core 110 downward, the height of the core 110 is lowered while the folded portions 112 of both the sidewalls move in a direction of facing each other (dotted arrow in FIG. 2).

In this process, the portion of the polymer film 130 corresponding to the space 101 may be spread outward to both sides as illustrated by solid arrows in FIG. 2.

Here, as described above, as the adhesive layer 120 is disposed on the inner surface of the polymer film 130 at a position corresponding to the space 101, the elasticity and mechanical strength of the polymer film 130 are improved by the adhesive layer 120, so that the polymer film 130 is easily and reliably spread to the outside of the space 101, and damages of the polymer film 130 or the metal layer 140 caused by external force are reduced.

Referring to FIG. 1 again, the polymer film 130 covering the space 101 maintains flatness so that the space 101 has a predetermined size, and has tension enough to prevent the core 110 from being deformed by the polymer film 130.

Figure 3A:
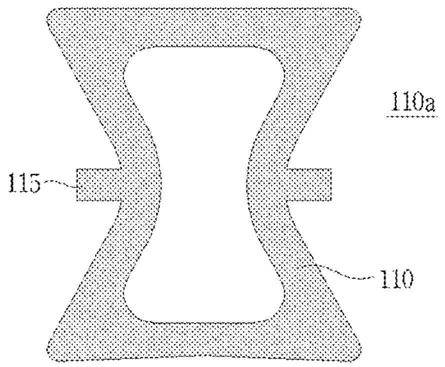
FIGS. 3A to 3C are views illustrating modified cores each having a through-hole.
Figure 3B:
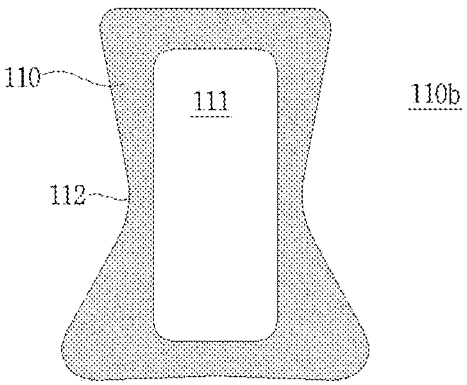
Figure 3C:
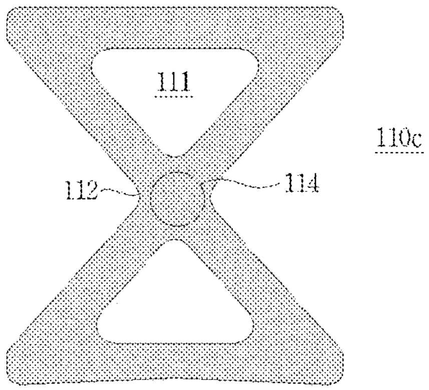

FIGS. 3A to 3C are views illustrating modified cores each having a through-hole.

Referring to FIG. 3A, a stopper 115 for restricting movement of a polymer film 130 is disposed at a folded portion 112 of a core 110 and integrated with the core 110 to protrude by a predetermined length and extend in a longitudinal direction (i.e., a direction into the ground).

The stopper 115 may restrict a depth by which the polymer film 130 moves inward instead of being spread outward when an electric contact terminal 100 is pressed from above to prevent the metal layer 130 from being damaged, which will be described later.

The stopper 115 is integrated with the core 110 during an extrusion process and may have a protruding length less than a width of the bottom surface and greater than a width of the top surface of the core 110.

Referring to FIG. 3B, a through-hole 111 of a core 110 has a rectangular shape so that a width of the through-hole 111 corresponding to a folded portion 112 is greater than that of the above-described embodiment. As a result, an electric contact terminal 100 has an advantage of being pressed sufficiently when pressed.

Referring to FIG. 3C, a core 110 has an approximate X-shape in a vertical cross-section, and a folded portion 112 is disposed at the intermediate portion of both the sidewalls.

According to this embodiment, a single intersection portion 114 is disposed at a portion at which the folded portions 112 are disposed, and upper and lower through-holes 111 are separated based on the intersection portion 114.

The above-described structure has an advantage in that an operation is stably and reliably performed because the intersection portion 114 moves downward, and the folded portions 112 are folded at left and right sides when the core 110 is pressed from above.

In the three embodiments of FIGS. 3A to 3C, the top surface of the core 110 may have a width less than that of the bottom surface of the core 110 so that a weight of the electric contact terminals 100 is disposed at a lower side, and the electric contact terminal 100 is in less contact with the outside.

The polymer film 130 disposed at the folded portion 112 is conventionally pushed to the outside of the space 101 when the core 110 is pressed from above, but rarely pushed into the space 101. The present disclosure may include both the cases.

In the case of being pushed into the space 101, the metal layer 140 has great possibility of being damaged as greater force is applied because as a curvature radius by which the polymer film 130 is folded is less than that of the case of being pushed to the outside of the space 101. In case of being pushed to the outside of the space 101, the metal layer 140 has reduced possibility of being damaged as less force is applied because as a curvature radius by which the polymer film 130 is folded is greater than that of the case of being pushed into the space 101.

Thus, when the width of the top surface of the core 110 is less than that of the bottom surface, since possibility in which the polymer film 130 is pushed into the space 101 is reduced, possibility in which the metal layer 140 is folded and damaged may be reduced.

In the electric contact terminal 100 according to this embodiment, when reflow soldering is performed in a state in which a top surface of the metal layer 140 is vacuum-picked up and a bottom surface of the metal layer 140 is pressed onto the solder cream on a conductive pattern 20 disposed on a circuit board 10, as is well known, the liquid molten solder cream is cooled between the bottom surface of the metal layer 140 and the conductive pattern 20 to form a solid solder layer 30 and be mounted on the circuit board 10.

As described above, when the soldered electric contact terminal 100 is pressed downward from above in a vertical direction, there is an advantage in that a damage or a crack of the metal layer 140 is minimized because deformation in cross-sectional shape of the polymer film 120 caused by the space 101 when the electric contact terminal 100 is pressed downward from above does not follow deformation in cross-sectional shape of the core 110.

Figure 4A:
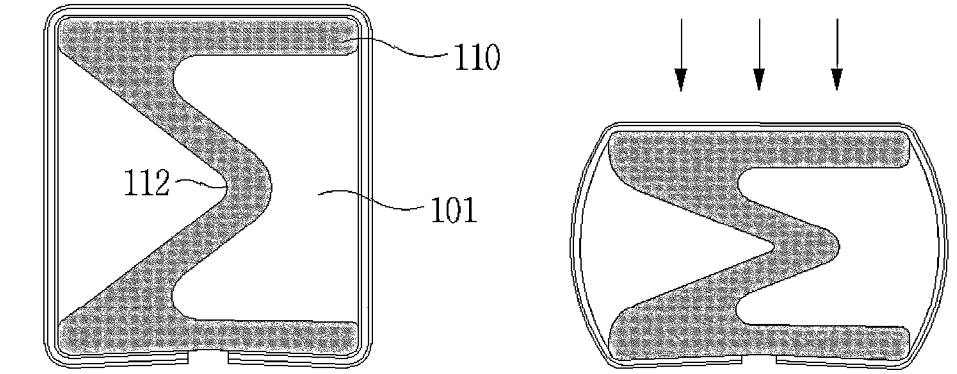
FIGS. 4A to 4C are views illustrating elastic electric contact terminals according to other embodiments.
Figure 4B:
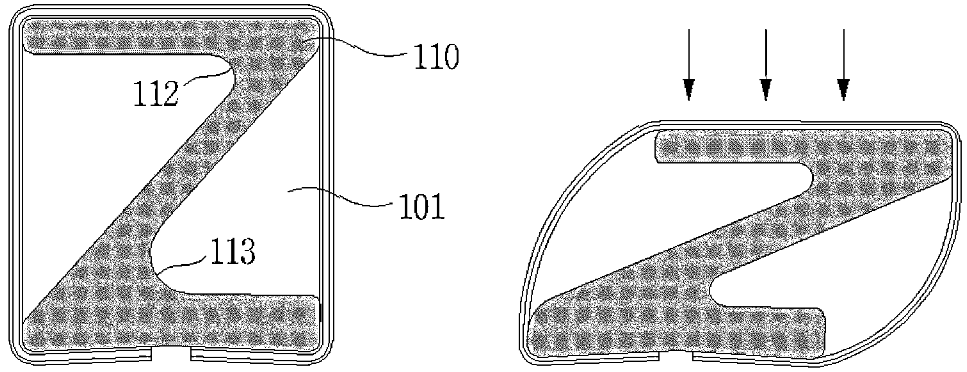
Figure 4C:
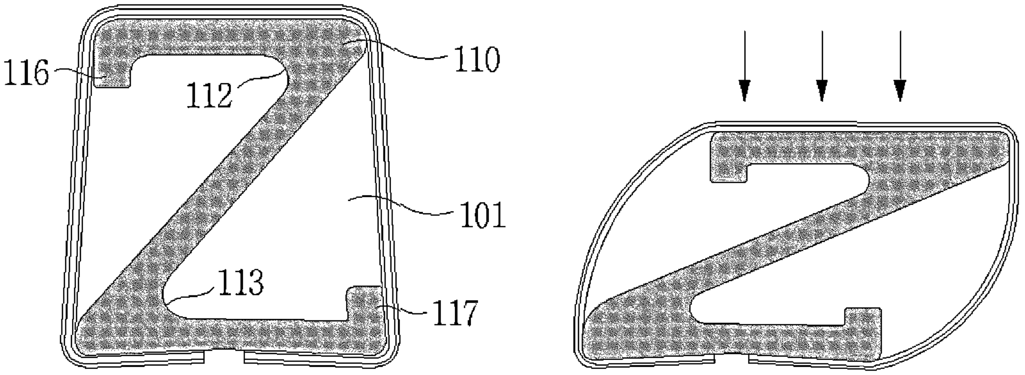

FIGS. 4A to 4C are views illustrating elastic electric contact terminals according to other embodiments.

Referring to FIG. 4A, a core 110 has a sigma (Σ) shape in a vertical cross-section, and a folded portion 112 is disposed at an intermediate portion of one sidewall.

According to this embodiment, when the core 110 is pressed from above, the folded portion 112 may be pressed inward more than the embodiment of FIG. 1. Thus, a distance by which the core 110 is pressed may increase.

The electric contact terminal 100 having the above-described shape has an advantage of reducing overall pressing force.

Referring to FIG. 4B, a core 110 has a Z-shape in a vertical cross-section in which upper and lower walls and an inclined sidewall connecting the upper and lower walls are integrated with each other, and folded portion 112 and 113 are disposed on upper and lower ends of the inclined sidewall, respectively.

According to this embodiment, when the core 110 is pressed downward from above, a folded portion 113 mounted and fixed on a circuit board is folded as it is while a folded portion 112 disposed at an upper right side is pressed and pushed so that a polymer film 130 is spread to the outside.

In this embodiment, as a lower wall of the core 110 has a thickness greater than that of an upper wall of the core 110, the core 110 may have improved resilience and maintain a stable state during soldering, and a metal clip may be stably gripped when the metal clip is applied, which will be described later.

FIG. 4C is a modified example of FIG. 4B, in which an end of a top surface of a core 110 is bent to extend downward to form a folded portion 116, and an end of a bottom surface is bent to extend upward to form a folded portion 117.

The above-described structure has an advantage in that an electric contact terminal 100 is not pressed any more by the folded portions 116 and 117 when pressed downward from above.

Also, since a polymer film 130 is attached to the folded portions 116 and 117 with an adhesive layer 120 therebetween, the polymer film 130 and a metal layer 140 disposed at positions corresponding to a space 101 are more stable.

In each of the embodiments of FIG. 4, in common, folded portions 112 and 113 by which at least one sidewall of the core 110 is pressed are provided, and the space 101 is defined between an inner surface of the polymer film 130 and a sidewall of the core by the folded portions 112 and 113.

When the electric contact terminal 100 is pressed, the polymer film 130 may be spread to the outside of the space 101.

Also, as illustrated in FIG. 4C, a width of a top surface of the core 110 may be greater than that of a bottom surface of the core 110 so that the electric contact terminal 100 moves little when surface-mounted and has excellent soldering strength after soldered.

Since both sidewalls and edges of the core 110 are covered by the polymer film 130, there is an advantage of preventing the edges of the core 110 from being lifted by external force.

As described above, although the core 110 is made of silicone rubber having excellent elasticity in each of the embodiments of FIG. 4, the embodiment of the present disclosure is not limited thereto. For example, the core 110 may be made of a metal material such as copper alloy or stainless steel having great mechanical strength.

When the metal material is used, the core 110 may be manufactured with a small thickness because the metal material has greater mechanical strength than silicone rubber.

The metal material may have great strength and excellent elasticity.

Figure 5A:
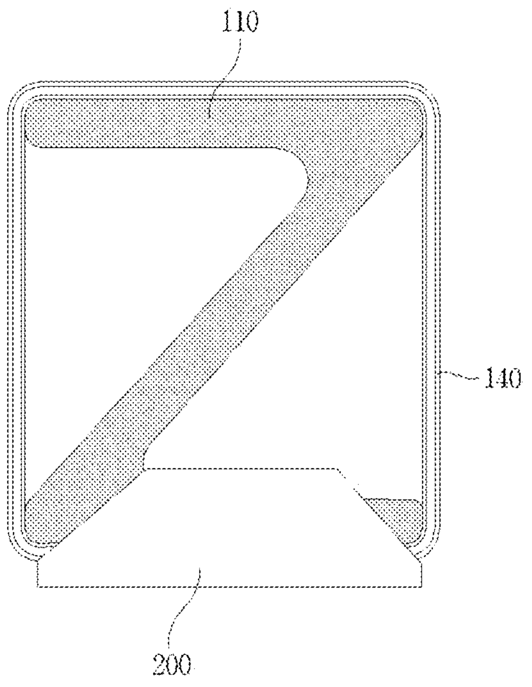
FIGS. 5A and 5B are views each illustrating a state in which a metal clip is applied.
Figure 5B:
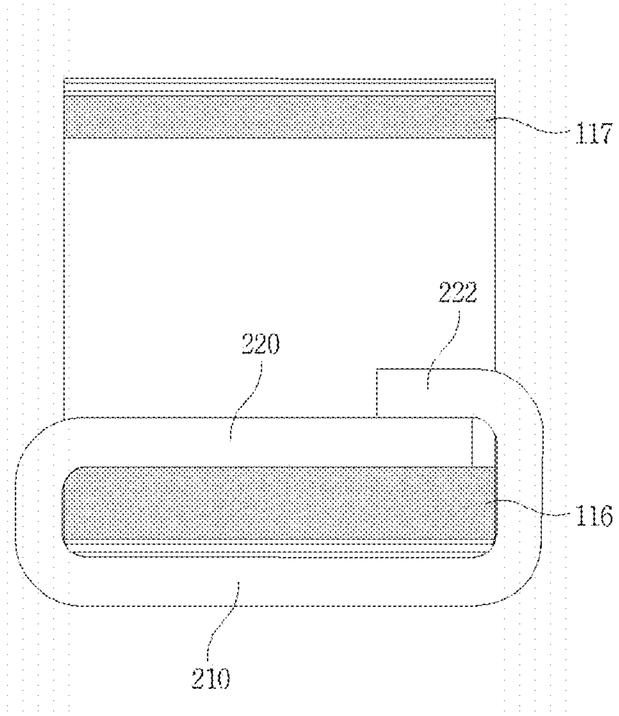

FIGS. 5A and 5B are views each illustrating a state in which a solderable metal clip 200 is applied.

The core 110 with the metal clip 200 applied has a Z-shape as an example in this embodiment, and this may be equally applied to the above-described embodiments.

The metal clip 200 is inserted into a lower portion of the core 110 so as to be in close contact with a bottom surface of the core 110. The metal clip 200 includes a base 210 extending in a longitudinal direction and being in contact with the bottom surface of the core 110 and bridges 220 and 222 bent at both ends of the base 210 to grip a lower wall of the core 110 at both ends in the longitudinal direction, respectively.

In the above-described structure, the metal clip 200 prevents the metal layer 140 from being damaged when the metal layer 140 is not soldered and repeatedly pressed and improves soldering strength.

Also, there is an advantage in that soldering strength may increase by the metal clip 200 even when the electric contact terminal has a short length.

Korean Patent Registration No. 2340421 filed and registered by the present applicant discloses another modified example of the metal clip applied to the electric contact terminal of the present disclosure.

The above-described structure or shape has an advantage in that the electric contact terminal according to the present disclosure may be pressed with less force and with many times, and the metal layer is less deformed or cracked when pressed a lot or repeatedly.

Also, there is an advantage in that electric contact terminal may be easily manufactured in various shapes, and reflow soldering may be reliably performed.

According to the present disclosure, since the polymer film disposed in the direction opposite to the folded portion is reliably spread to the outside of the sidewall when the electric contact terminal is pressed downward from above by external force after the electric contact terminal is soldered to the circuit board, the metal layer may be hardly affected, and the deformation or the crack of the metal layer may be minimized.

Also, the present disclosure easily and maximally provides the space defined by the sidewall and the polymer film of the core by the shape of the core in the reliable and economical manner.

Also, since the width of the top surface of the core is less than that of the bottom surface, and the spaced distance of the polymer film is positioned at the bottom surface of the core, the damage caused by the external force is small.

Also, as the elastic reinforcing layer is disposed on the polymer film to ensure the elasticity and the strength, the metal layer and the polymer film are protected from the external force, and the polymer film disposed at the folded portion is easily curved when pressed in the vertical direction.

Also, the polymer film covering the folded portion prevents the edges of the core from being spread upward by the external force.

Also, as the center of gravity of the electric contact terminal is positioned below the portion in which the electric contact terminal is reflow-soldered, the reliable surface mounting is provided.

Also, since the metal clip capable of being reflow-soldered is inserted to the lower portion of the core, the soldering strength may increase even when the electric contact terminal has the short length.

Although the exemplary embodiment of the present invention has been shown and described above, various changes and modifications which can be understood by a person skilled in the art may also be made. Thus, the present invention should not be construed as being limited to only the foregoing embodiment, but be construed by the appended claims.

What is claimed is:

1. An elastic electric contact terminal comprising:

an elastic core having a generally hourglass-shaped vertical cross-section;

a heat-resistant polymer film surrounding the elastic core with an elastic adhesive layer applied under the heat-resistant polymer layer, wherein the heat-resistant polymer film is attached to top and bottom surfaces of the elastic core with the elastic adhesive layer adhered therebetween; and a metal layer disposed on an outer surface of the polymer film, wherein a through-hole that passes in the longitudinal direction is defined in the elastic core, and a surface for vacuum-pick up is provided on top surface of the electric contact terminal, wherein the elastic electric contact terminal defines a vacant space between a generally flat inner wall surface of the adhesive layer adhered polymer film and each sidewall of the elastic core, wherein each vacant space has a generally flat cross-sectional line segment defined by the generally flat inner wall surface of the adhesive layer adhered polymer film, and a generally valley-shaped cross-sectional line segment defining a folded portion at a deepest region of the hourglass-shaped elastic core, when the top surface of the elastic electric contact terminal is not pressed downward from above.

2. The elastic electric contact terminal of claim 1, wherein the folded portion is symmetrically disposed on both sidewalls of the elastic core.

3. The elastic electric contact terminal of claim 1, wherein the folded portion is disposed at an intermediate portion of a height direction of the elastic core.

4. The elastic electric contact terminal of claim 1, wherein a stopper is integrated with the elastic core and disposed at the folded portion of the elastic core in a horizontal direction.

5. The elastic electric contact terminal of claim 1, wherein the adhesive layer is disposed on the entire inner surface of the polymer film.

6. The elastic electric contact terminal of claim 1, wherein an elastic reinforcing layer made of a polymer material is integrated with the polymer film between the polymer film and the adhesive layer, the elastic reinforcing layer having a uniform thickness.

7. The elastic electric contact terminal of claim 1, wherein the polymer film is bulged outward in a direction opposite to a direction in which the folded portion is folded when the electric contact terminal is soldered and pressed downward from above.

8. The elastic electric contact terminal of claim 1, wherein the polymer film configured to cover the vacant space is maintained to be flat so that the vacant space has a constant size and has tension that is enough to prevent the elastic core from being deformed.

9. The elastic electric contact terminal of claim 1, wherein a width of the bottom surface of the elastic core is greater than that of the top surface of the elastic core, a thickness of a lower wall of the elastic core is greater than that of an upper wall of the elastic core, or a volume of the lower wall of the elastic core is greater than that of the upper wall of the elastic core.

10. The elastic electric contact terminal of claim 1, further comprising a metal clip that is inserted to a lower portion of the elastic core so as to be in contact with the bottom surface of the elastic core and reflow-soldered, wherein the metal clip comprises:

a base that extends in the longitudinal direction and is in contact with the bottom surface of the elastic core; and bridges bent at both ends of the base to grip a lower wall of the elastic core at both ends in the longitudinal direction, respectively.

11. An elastic electric contact terminal comprising:

an elastic core;

a heat-resistant polymer film surrounding the elastic core with an elastic adhesive layer applied under the heat-resistant polymer layer, wherein the heat-resistant polymer film is attached to top and bottom surfaces of the elastic core with the elastic adhesive layer adhered therebetween; and a metal layer disposed on an outer surface of the polymer film, wherein the elastic core has a sigma (Σ) shaped vertical cross-section, wherein a surface for vacuum-pick up is provided on the top surface of the electric contact terminal, wherein a folded portion is disposed on a sidewall of the elastic core between the top and bottom surfaces of the elastic core by the shape of the vertical cross-section, and wherein a vacant space is defined between an inner surface of the polymer film and the sidewall of the elastic core by the folded portion, and reflow soldering caused is performed by surface mounting.

12. An elastic electric contact terminal comprising:

an elastic core;

a heat-resistant polymer film surrounding the elastic core with an elastic adhesive layer applied under the heat-resistant polymer layer, wherein the heat-resistant polymer film is attached to top and bottom surfaces of the elastic core with the elastic adhesive layer adhered therebetween; and a metal layer disposed on an outer surface of the polymer film, wherein the elastic core has a Z-shaped vertical cross-section, wherein a surface for vacuum-pick up is provided on the top surface of the electric contact terminal, wherein the elastic electric contact terminal defines a vacant space between a generally flat inner wall surface of the adhesive layer adhered polymer film and a sidewall of the elastic core, wherein each vacant space has a generally flat cross-sectional line segment defined by the generally flat inner wall surface of the adhesive layer adhered polymer film, and a generally angular cross-sectional line segment defining a folded portion by the shape of the Z-shaped vertical cross-section of the elastic core, when the top surface of the elastic electric contact terminal is not pressed downward from above.

13. An elastic electric contact terminal comprising:

an elastic core having a vertical cross-sectional shape defined by two isosceles triangles joined at their apices, the elastic core including a through-hole extending longitudinally through each of the isosceles triangles;

a heat-resistant polymer film surrounding the elastic core with an elastic adhesive layer applied under the heat-resistant polymer layer, wherein the heat-resistant polymer film is attached to top and bottom surfaces of the elastic core with the elastic adhesive layer adhered therebetween; and a metal layer disposed on an outer surface of the polymer film, wherein a surface for vacuum-pick up is provided on top surface of the electric contact terminal, wherein the elastic electric contact terminal defines a vacant space between a generally flat inner wall surface of the adhesive layer adhered polymer film and a sidewall of the elastic core, wherein each vacant space has a generally flat cross-sectional line segment defined by the generally flat inner wall surface of the adhesive layer adhered polymer film, and a generally angular cross-sectional line segment defining a folded portion at a deepest region of the elastic core, when the top surface of the elastic electric contact terminal is not pressed downward from above.

* * * * *